Feb. 27, 1968  J. SWARBRICK  3,370,371
ANIMATED DISPLAY DEVICE
Filed Aug. 3, 1964  3 Sheets-Sheet 3

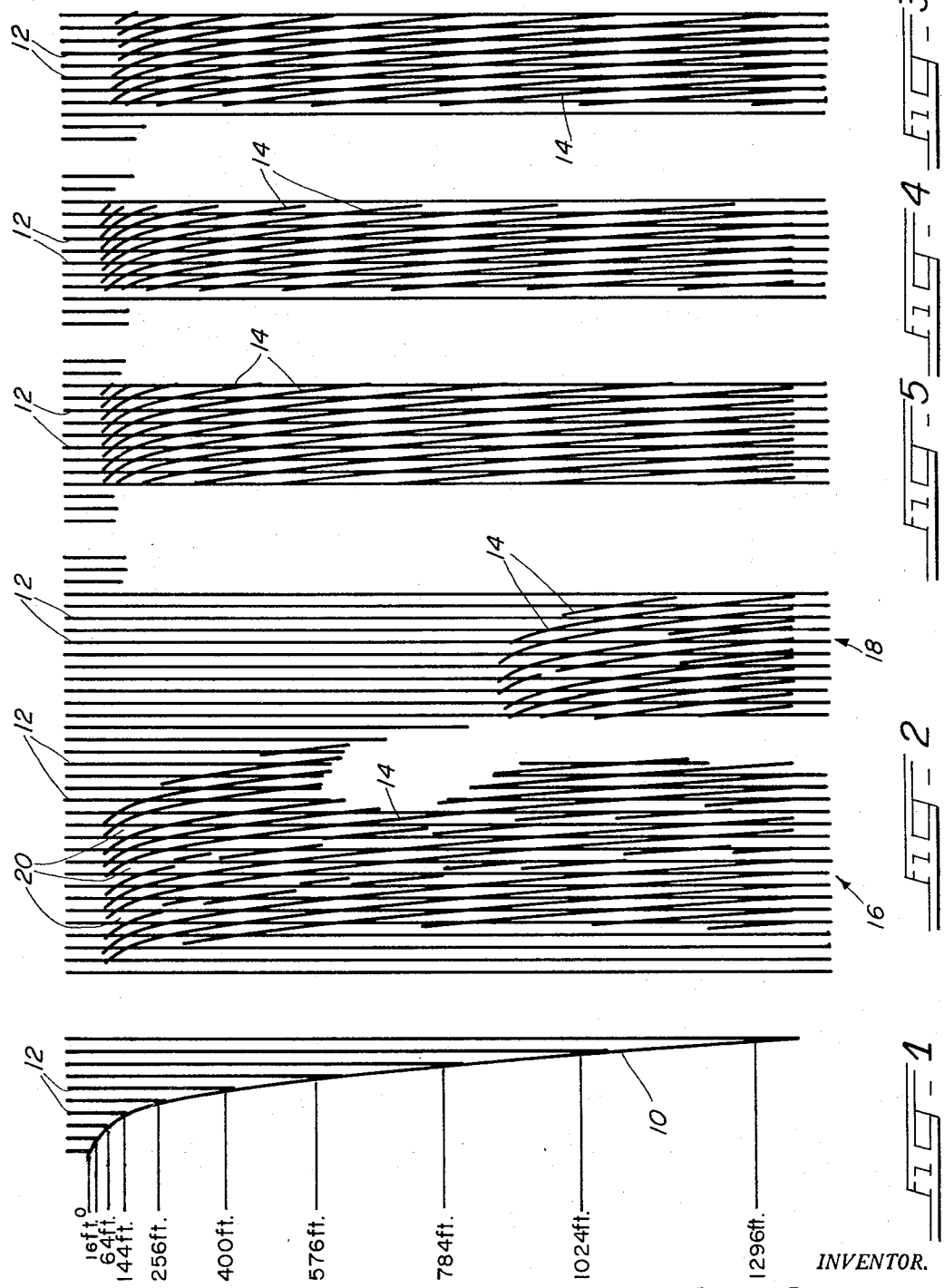

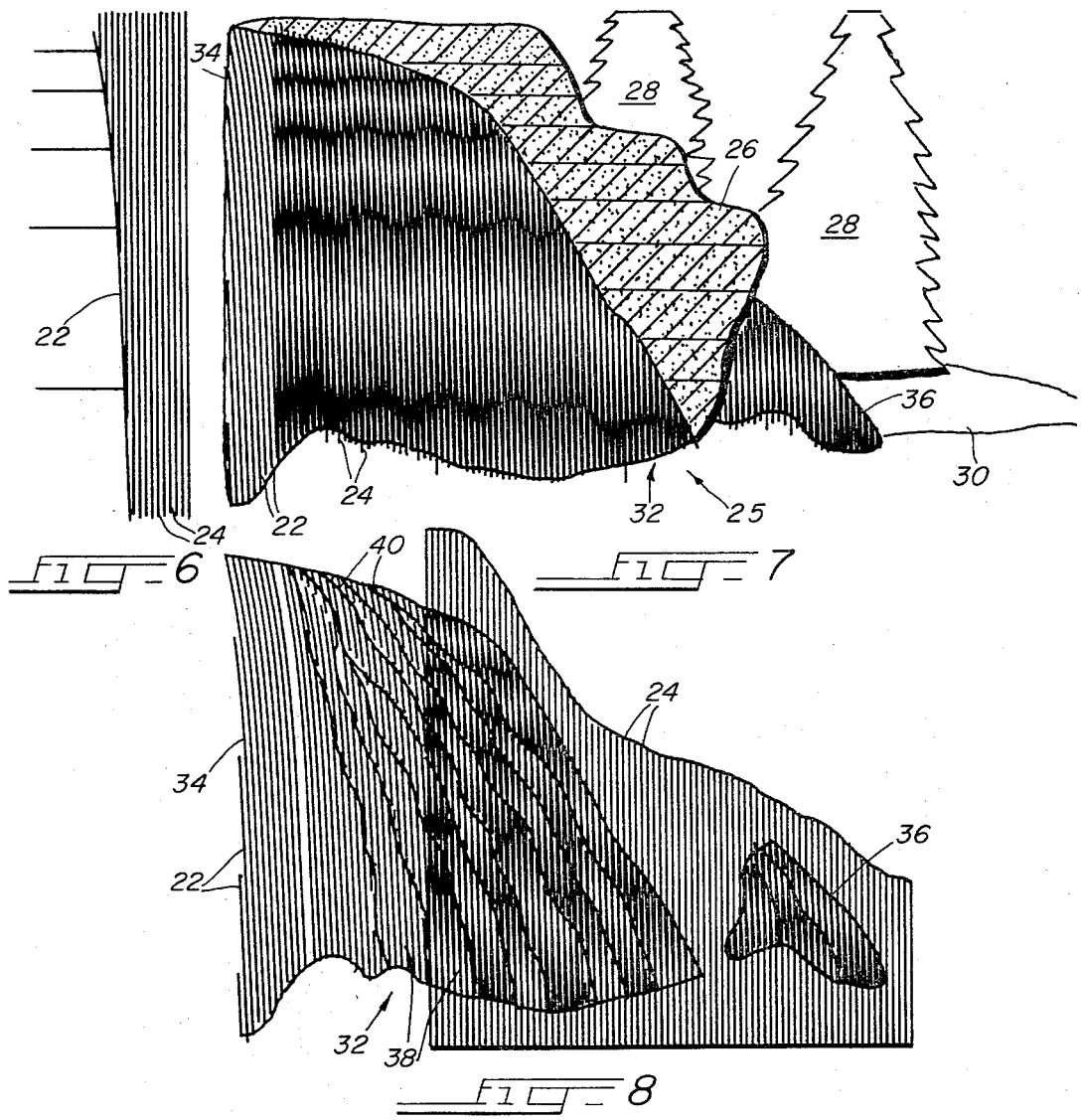

INVENTOR.
JOHN SWARBRICK
BY
ATTORNEY

United States Patent Office 3,370,371
Patented Feb. 27, 1968

3,370,371
ANIMATED DISPLAY DEVICE
John Swarbrick, 480 S. Maple St., Nokomis, Ill. 62075
Filed Aug. 3, 1964, Ser. No. 387,107
6 Claims. (Cl. 40—137)

This invention relates generally to animated display devices of the type disclosed in U.S. Patents Nos. 2,876,570 and 2,918,743 and more particularly to improvements in such display devices which most realistically simulate multi-directional motion and the motion of a falling body such as a waterfall.

There were disclosed in the above-mentioned prior patents display devices which gave the illusion of a rotating body such as a wheel and of a uniformly receding body such as a body of rippling water. Both of the patented devices obtained the illusion of motion by means of series of moires formed by the projection of a group of parallel regularly spaced lines against a second group of patterned and differently spaced lines. When one group of lines was moved with relation to the other, the moires appeared to move and give the described illusions.

It will of course be appreciated that the most difficult problem in devices of the type under consideration is to eliminate to the greatest extent possible all mechanical appearances and thereby create the most realistic illusion possible. Thus, while the effects created by the patented devices were novel, interesting and relatively life-like, they could be employed only for the specific rotating or rippling motions indicated. Due to the limited regularity of the motion, the entire device scene had a tendency to assume undesirable mechanical appearances.

It is therefore an important object of this invention to provide an animated display device of the character described having improvements which permit new dimensions and types of motions to increase the versatility and adaptability thereof.

Another object is to afford an animated display device of the character described having improvements which permit simultaneous multi-directional motion to create more realistic illusions than heretofore attainable.

Still another object is to provide an animated display device of the character described which is capable of realistically simulating the motion of a free falling body. A specific related object is to provide such a device which realistically simulates a waterfall.

Yet another object is to afford an animated display device of the character described in which the patterned lines are parabolic in configuration and comprise segments of uniformly accelerated motion curves related to the particular freely falling body depicted.

A further object is to provide an animated display device of the character described which is extremely simple in operation and substantially trouble free and yet is most eye catching, realistic and pleasant to observe.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a typical parabolic uniformly accelerated motion curve for a free falling body showing the increased distances the body falls with the passage of time;

FIG. 2 shows a series of parabolic uniformly accelerated motion curves projected upon a series of uniformly spaced vertical lines to provide a plurality of moires and a crudely simulated waterfall;

FIG. 3 shows a series of parabolic uniformly accelerated motion curves projected upon a series of vertical lines with the horizontal spacing between the curved lines and vertical lines being equal to illustrate the resulting horizontal orientation of the moires;

FIG. 4 is a similar view but with the horizontal spacing between the curved lines being decreased to illustrate the resulting upward and to the left tilt of the moires;

FIG. 5 is a similar view but with the horizontal spacing between the curved lines being increased to illustrate the resulting upward and to the right tilt of the moires;

FIG. 6 is a view similar to FIG. 1, but showing a particular parabolic curve and spacing of vertical lines employed in a specific display device embodying the principles of the invention;

FIG. 7 shows the evolution of a waterfall scene employing the curve and spaced vertical lines of FIG. 6;

FIG. 8 is a similar view showing an additional stage of evolution wherein the waterfall is broken up into rivulets.

Figure 9:
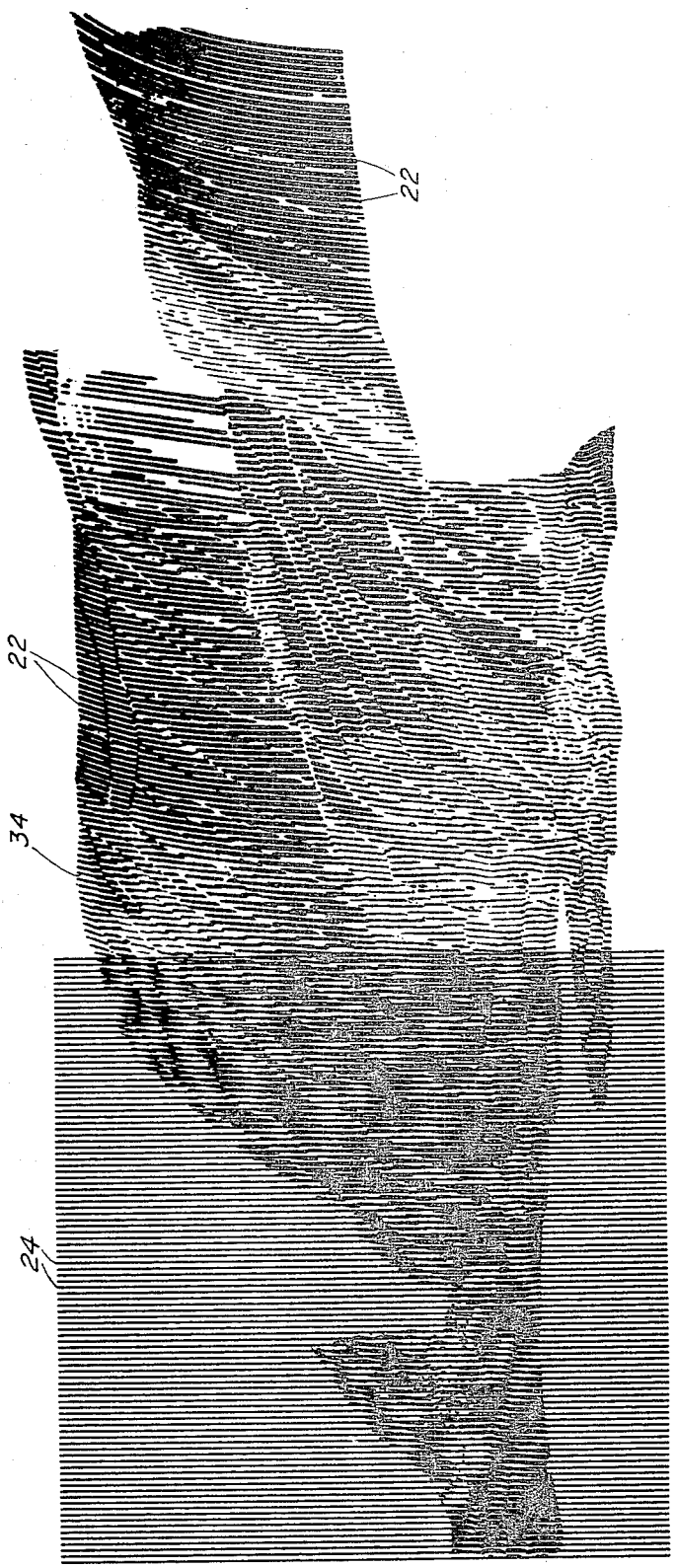
FIG. 9 shows the completely evolved waterfall scene.

The herein invention utilizes the parabolic curve, or portions thereof, described by a constantly accelerating free falling body to most realistically simulate the motion of such body. Turning first to FIG. 1 of the drawings, there is illustrated a parabolic curve 10 and a plurality of uniformly spaced vertical lines 12 intersecting said curve. The center to center spacing of the vertical lines 12 is one-tenth (1/10) inch, so that if we assume the lines are on a belt moving horizontally at the rate of one line per second, the distance between each adjacent pair of said lines represents a time interval of one second. Employing the well-known equation:

$$\text{distance} = 1/2 \, at^2$$

it will thus be seen that at the end of each second from 1 to 9, the object will have fallen the distances indicated from sixteen feet to 1296 feet.

In calculating the curve to use in depicting a particular falling object, I therefore first determine the distance said object is to fall and then solve the equation to give the number of seconds it must take for a moire to travel from the top to the bottom of the scene. Thus, for example, there is shown in FIG. 2, a series of parabolic curves 14 superimposed over a series of uniformly spaced vertical lines 12. The curved lines 14 are divided into two sections 16 and 18 to crudely define a waterfall, and it will be noted that the curve of the lower section 18 is the same as the curve at the top of the upper section 16. Similarly, the horizontal spacing between adjacent curves 14 is increased as at 20, for reasons which will become apparent as the description proceeds.

In FIGURES 3 through 5 there is illustrated the effect of varying the horizontal spacing between the curved lines 14 with relation to the fixed spacing between the vertical lines 12. Thus, for example, in FIG. 3 the horizontal spacing between the curves 14 is the same as between the lines 12 and it will be seen that the resulting moires are horizontally oriented. In FIG. 4, the spacing between the curves is reduced—viz., more curves per unit of measurement—and it will be seen that the resulting moires are tilted upward and to the left. Increasing the spacing between the curves 14 results in the moires being tilted upward and to the right as illustrated in FIG. 5. It will thus be appreciated that the visual direction of motion may be changed by varying the spacing of the curves as described.

The manner in which a particular falling body scene is evolved may now be appreciated by referring to FIGS. 6–8 of the drawings. In FIG. 6 there is shown a portion of a parabolic curve 22 which has been calculated and used in an actual display device waterfall scene. Top portions of the curve 22 are missing because the particular waterfall is presumed to already possess a forward and downward velocity at its top in the depicted scene. The vertical time lines 24 have a spacing of approximately 22 lines per inch and the same may be positioned on a continuous or endless belt which moves continuously at a speed of approximately seven and one-half (7½) inches per minute or approximately two and three-quarters (2¾) lines per second.

A waterfall scene, indicated generally by the numeral 25 is painted or otherwise positioned upon a planar member which is parallel to the belt upon which are positioned the vertical lines 24. The planar member generally comprises a transparent member of glass or the like, and the scene 25 may include various opaque areas such as a rock formation 26, trees 28 and shoreline 30. The scene 25 also includes a transparent area containing the outline of a waterfall 32 which may include a large falls section 34 and a smaller falls section 36. It is important to note that the entire waterfall outline consists of a plurality of spaced curves 22, each of which comprises a portion of the parabolic curve 22. Since the waterfall area is transparent, the projections of the vertical lines 24 may of course be seen therethrough. As indicated in FIG. 7, the projection of the vertical lines 24 through the transparent waterfall 32 results in a series of moires which increase in spacing from top to bottom. It will be noted that the moires are substantially horizontal because the horizontal spacing between the curves 22 is substantially identical with the spacing between the lines 24.

Referring now to FIG. 8 of the drawings, the manner of achieving multi-directional motion may now be described. It will thus be seen that the waterfall 32 is cut into a plurality of sections 38 along a plurality of free flowing lines such as 40. Each of the sections 38 is then offset from its adjacent section a distance of one-half the horizontal spacing between the curved lines. As illustrated, and as previously described above, this offsetting results in a tilting of the moires and an illusion of multi-directional movement such as would be present in the various rivulets of an actual waterfall.

To add even further realism to the waterfall 32, the curves 22 may be artistically altered to fit the particular scene being depicted. Turning then to FIG. 9, it will be seen that the completed waterfall 32 contains curves 22 of varying thickness and intensity. Similarly, the spacing between the thinner and lighter lines is increased. As indicated, the lighter and wider spaced curves most realistically simulate the foaming or frothy areas of a waterfall. Also, the orientation of the curves 22 varies so that they are more nearly vertical where the water is moving at the highest velocity and falling the greatest distance per unit of time. When the belt containing the vertical lines 24 is moved horizontally, the projections of said lines through the transparent waterfall 32 causes the waterfall to move in a manner which most accurately simulates the natural phenomena of waterfalls.

In general, the parts of the display device are arranged and motivated in a manner similar to that shown in Patent No. 3,258,868 or in the aforementioned Patent No. 2,918,743. Thus, for example, the planar member bearing the waterfall scene 25 may comprise a sheet of transparent glass or plastic. A transparent plastic endless belt having the vertical lines 24 positioned thereon is mounted behind the plate so that the front flight of the belt is parallel and in close proximity to said plate. Illumination means is provided to radiate through the front flight of the belt and the transparent portions of the waterfall scene. When the belt is rotated by a suitable motor, the optical projections of the moving vertical lines against the curved lines of the scene cause the described waterfall motions which is visible to the observer.

From the foregoing description and drawings, it should be apparent that I have provided a novel animated display device having improvements which most realistically simulate motions and objects not heretofore possible. The improved device is capable of reproducing the motion of falling bodies and utilizes the parabolic uniformly accelerated motion curves of such bodies for this purpose. In addition, the improved device reproduces multi-directional motion such as would be present in an actual waterfall or the like.

It is believed that my invention, its mode of construction and assembly, and many of its advantages should be readily understood from the foregoing without further description, and it should also be manifest that while a preferred embodiment of the invention has been shown and described for illustrative purposes, the structural details are nonetheless capable of wide variation within the purview of my invention as defined in the appended claims.

What I claim and desire to secure by Letters Patent of the United States is:

1. An animated display device comprising a pair of members having mutually spaced planar portions,
    one of said portions having thereon spaced parallel lines extending in a predetermined direction thereover,
    the other of said portions having thereon a decorative scene depicting a falling object and including a transparent area,
    said transparent area having thereon a series of spaced curved lines,
    said curved lines being of substantially parabolic shape and comprising uniformly accelerated motion curves related to the true perspective distance said object must fall in said scene,
    said other portion being located between said one portion and the point of observation of said device,
    illumination means positioned to radiate through said two planar portions,
    the optical projections of said parallel lines toward said point of observation intersecting said curved lines so as to form a series of moires,
    and means for moving one of said portions with relation to the other whereby said moires move in a predetermined pattern and at a predetermined speed which realistically simulates the falling of said object.

2. The display device of claim 1 in which the spacing between adjacent ones of said curved lines varies so that said moires tilt in different directions and appear to the observer to be moving in different directions.

3. The display device of claim 2 in which said object comprises a waterfall, at least some of said curved lines being segmented and laterally offset at a plurality of points along their length so that said waterfall appears to the observer to be broken up into a plurality of rivulets.

4. The display device of claim 1 in which the spacing between said moires increases from the top to the bottom of said scene so that said object appears to be falling at a greater velocity the farther it falls.

5. The display device of claim 3 in which at least some of said curved lines are of lesser thickness and intensity of opaqueness so that the optical projections of said vertical lines thereagainst most realistically simulates the foaming areas of said waterfall.

6. An animated display device comprising an endless horizontal belt having a substantially planar front portion,
  said belt having thereon spaced vertical lines extending over the length thereof,
  a planar member in parallel spaced relation in front of said front belt portion,
  said member having thereon a decorative scene including substantially opaque areas and a transparent area,
  said transparent area having thereon a series of spaced curved lines defining a waterfall,
  said curved lines being of substantially parabolic shape and comprising uniformly accelerated motion curves related to the true perspective height of said waterfall,
  at least some of said curved lines being segmented and laterally offset at a plurality of points along their lengths so that said waterfall is broken up into a plurality of rivulets,
  at least some of said curved lines being thinner and lighter in intensity to simulate the foaming areas of said waterfall,
  illumination means positioned to radiate through said planar member and the front portion of said belt,
  the optical projections of said parallel lines toward an observer intersecting said curved lines to form a series of moires,
  said moires projecting in different directions and the vertical spacing therebetween increasing from the top to the bottom of said waterfall,
  and means for moving said belt whereby said moires move to realistically simulate the multi-directional and plural-streamed falling of said waterfall.

References Cited

UNITED STATES PATENTS

| | | | |
|---|---|---|---|
| 2,624,142 | 1/1953 | Sayre | 40—137 |
| 2,917,854 | 12/1959 | Swarbrick | 40—137 |
| 2,918,743 | 12/1959 | Swarbrick | 40—137 X |
| 3,258,868 | 7/1966 | Taylor et al. | 40—106.53 |

LAWRENCE CHARLES, *Primary Examiner.*